(12) United States Patent
Vallabh

(10) Patent No.: US 7,054,832 B1
(45) Date of Patent: May 30, 2006

(54) SYSTEM FOR MERCHANDIZE TRANSACTIONS

(76) Inventor: Rajesh Vallabh, 50 Undine Rd., Unit 1, Brighton, MA (US) 02135

( * ) Notice: Subject to any disclaimer, the term of this patent is extended or adjusted under 35 U.S.C. 154(b) by 1097 days.

(21) Appl. No.: 09/598,196

(22) Filed: Jun. 21, 2000

Related U.S. Application Data

(60) Provisional application No. 60/140,762, filed on Jun. 24, 1999.

(51) Int. Cl.
*G06F 17/60* (2006.01)
(52) U.S. Cl. .......................... 705/26; 186/53
(58) Field of Classification Search ................ 705/26, 705/27; 186/53
See application file for complete search history.

(56) References Cited

U.S. PATENT DOCUMENTS

| | | | |
|---|---|---|---|
| 5,158,155 A * | 10/1992 | Domain et al. ............... | 186/53 |
| 5,186,281 A * | 2/1993 | Jenkins ........................ | 186/55 |
| 5,310,999 A | 5/1994 | Claus et al. | |
| 5,414,624 A | 5/1995 | Anthonyson | |
| 5,434,394 A * | 7/1995 | Roach et al. ............... | 235/375 |
| 5,490,079 A | 2/1996 | Sharpe et al. | |
| 5,640,002 A * | 6/1997 | Ruppert et al. ............ | 235/472 |
| 5,737,619 A | 4/1998 | Judson | |
| 5,794,207 A | 8/1998 | Walker et al. | |
| 5,794,219 A | 8/1998 | Brown | |
| 5,875,296 A | 2/1999 | Shi et al. | |
| 5,960,411 A | 9/1999 | Hartman et al. | |
| 6,026,375 A * | 2/2000 | Hall et al. .................. | 705/26 |
| 6,246,998 B1 * | 6/2001 | Matsumori ................ | 705/27 |

FOREIGN PATENT DOCUMENTS

WO    WO 9905616 A1 *  2/1999

OTHER PUBLICATIONS

Palm VII Connected Organizer Whitepaper 1998.
Association of Consumer Direct Grocers—Resource Center Web Pages, date of first publication-unknown.
Mobil Speedpass Web Pages, date of first publication-unknown.
"Cruising Through Toll Plazas With the Windows Rolled Up" New York Times, Sep. 9, 1999, p. E11.
"Webvan Looks to Expand On-line Supermarket" Boston Globe, Jul. 11, 1999.
"US West Planning to Offer Web-Linked Screen Phones" New York Times, May 10, 1999, p. C2.
"Smart Kitchens Will Have Counter Intelligence" Boston Globe, May 6, 1999, p. 66.

* cited by examiner

*Primary Examiner*—Jeffrey A. Smith

(57) ABSTRACT

A method and system are provided for selling merchandize. The method includes receiving an order from a customer for a product desired to be picked up by the customer at a given location, readying the product for customer pickup at the given location after receiving the order, detecting the arrival of the customer, and moving the product to a loading station at the given location for customer pickup.

13 Claims, 18 Drawing Sheets

GROCERY SHOP HOME PAGE

Member Login:

Username: ☐

Password: ☐

*New Member Signup*

100

SHOPPER REGISTRATION FORM

Please provide the following information:

Secured Access Information:

Username: ▭

Password: ▭

Contact Information

Name: ▭

Address: ▭

Telephone No. ▭

Email Address: ▭

Demographic Information

Family Size: ▭

Number of children: ▭

Payment Information

Credit Card Number: ▭

Bank Account Debit Information: ▭

Billing Address: ▭

*SUBMIT*

120  FIG. 3

| PRODUCT CATEGORIES | |
|---|---|
| DAIRY<br>*Milk*<br>*Cheese*<br>*Yogurt* | PET FOOD<br>*Dog Food*<br>*Bird Food* |
| FRUIT<br>*Apples*<br>*Pears* | PHARMACY<br>*Cold Medication*<br>*Pain Relievers* |
| FROZEN FOODS<br>*Vegetables*<br>*Ice Cream* | |
| BAKERY<br>*Bread*<br>*Bagels* | |
| | KEY WORD SEARCH [ ]   find |

You have selected    Brand 'X'    Skim Milk    ½ Gallon

Price =    $2.00

Add this item to shopping cart?    Yes    No

---

You might wish to instead select the following item:

Brand 'Y'    Skim Milk    ½ Gallon

Price =    $1.80

Add this item to shopping cart?    Yes    No

180    FIG. 6

|  | MILK | | | |
|---|---|---|---|---|
| Brand 'X' | Skim Milk | ½ Gallon | $2.00 | ☑ |
|  |  | 1 Gallon | $4.00 | ☐ |
|  | Whole Milk | ½ Gallon | $2.00 | ☐ |
|  |  | 1 Gallon | $4.00 | ☐ |
| Brand 'Y' | Skim Milk | ½ Gallon | $1.95 | ☐ |
|  |  | 1 Gallon | $3.80 | ☐ |
|  | Whole Milk | ½ Gallon | $1.85 | ☐ |
|  |  | 1 Gallon | $3.60 | ☐ |

Add checked item to shopping cart?   *Yes*   *No*

200        FIG. 7

SHOPPING LIST

| 1 | Brand 'X' | Skim Milk | ½ Gallon | ☑ | $2.00 |
| 1 | Brand 'Y' | Whole Wheat Bread | Loaf | ☑ | $1.00 |

Add these items to shopping cart?   *Yes*   *No*

ITEMS IN CART

| BRAND | ITEM | SIZE | QUANTITY | PRICE |
|-------|------|------|----------|-------|
| X | Skim Milk | ½ Gallon | 1 | $2.00 |
| Z | Tuna Fish | 6 oz. Can | 4 | $5.00 |
| . | | | | . |
| . | | | | . |
| . | | | | . |
| Y | Plain Yogurt | 8 oz. | 1 | $1.00 |
| | | | TOTAL | $20.00 |

*CONTINUE SHOPPING*

DONE
    Arrange *PICKUP* or *DELIVERY*

DELIVERY INFORMATION

Deliver to          123 Main Road, Anytown NY 12345

Select Delivery Time for today          (*click here for other days*)

| Time | Price | Bonus Points |
|------|-------|--------------|
| *As soon as possible* | $12.00 | 0 |
| *2:00-2:30 PM* | $6.00 | 10 |
| *2:30-3:00 PM* | $8.00 | 0 |
| ⋮ | | |
| *9:00-9:30 PM* | $2.80 | 200 |
| *9:30-10:00 PM* | $2.80 | 200 |

PICKUP INFORMATION

Select Pickup Time for today     (*click here for other days*)

| Time | Price Adjustment | Bonus Points |
|---|---|---|
| *As soon as possible* | +$4.00 | 0 |
| *2:00-2:15 PM* | +$2.00 | 0 |
| *2:15-2:30 PM* | +$2.00 | 0 |
| *2:30-2:45 PM* | none | 0 |
| ⋮ | | |
| *9:30-9:45 PM* | -$1.00 | 200 |
| *9:45-10:00 PM* | -$1.50 | 300 |

Select Pickup Service

*Self Serve Pickup*     no additional charge

*Full Service Pickup*     $0.85 additional charge

*SUBMIT*

260                     FIG. 11

SYSTEM FOR MERCHANDIZE TRANSACTIONS

RELATED APPLICATION

This application is based on Provisional U.S. Application Ser. No. 60/140,762 filed on Jun. 24, 1999.

BACKGROUND OF THE INVENTION

1. Field of the Invention

The present invention relates generally to merchandize transactions and, more particularly, to an automated method and system for making such transactions.

2. Description of Prior Art

Grocery shopping is typically a tedious and time-consuming chore. For example, a shopper must typically drive to the grocery store, find a parking spot and park his or her vehicle, walk to the store from the parking lot, find a shopping cart, walk through numerous isles to find and retrieve products needed, line up at a counter to pay a cashier, wait for the products to be sacked, take the purchased items to the vehicle, and return the shopping cart. This process can be particularly difficult and tiresome for shoppers with young children and for the elderly.

Once in the store, the shopper may be disappointed to find that certain items are unavailable (e.g., they may be sold out or not even carried by the store). To keep items from being sold out, stores often keep greater inventories of products available than they expect to sell. This is a costly practice particularly with perishable goods (such as refrigerated products like milk) since unsold products often become spoiled and are wasted.

There are substantial overhead costs associated with operating traditional grocery stores, which typically are large supermarkets. For instance, serving customers requires many employees (e.g., product stockers, cashiers, personnel to clean and maintain the store, and personnel to manage cash received from customers). A large parking lot must be provided for customer vehicles. The store is typically large and on a single floor with wide isles to accommodate shopping carts. The store must also be well lit and aesthetically maintained.

The vast majority of merchandize sold at grocery stores is standardized, and product manufacturers typically exercise careful quality control on the products they make. As a result, one item on a store shelf (such as a box of cereal of a particular brand and size) will be identical for all practical purposes to an item of the same brand and size stacked behind it. Consequently, there is little need for shoppers to inspect the particular products they want before making the purchase.

Recently, a number of Internet-based grocery shopping systems have been introduced. For example, companies like peapod.com allow shoppers to place orders online for groceries to be delivered to their homes. While these new online businesses offer several advantages over traditional grocery stores, they in some respects are operated in similar fashion to the traditional stores and face many of the same problems. In addition, these businesses face the problem of the high cost and difficulty of delivering ordered products to customers.

A need exists for an improved method and system for selling merchandize, especially groceries.

BRIEF SUMMARY OF THE INVENTION

An improved method and system are provided for selling merchandize like groceries. In accordance with one embodiment of the invention, a method for selling merchandize is provided that includes receiving an order from a customer for products desired to be picked up by the customer at a given location, readying the products for customer pickup after receiving the order, detecting the arrival of the customer at the given location, moving the products to a loading station, and directing the customer to the loading station to pickup the ordered products. There are preferably multiple loading stations, which are preferably dynamically selected for use based on factors such as availability.

In accordance with another embodiment of the invention, prices for products are dynamically calculated based on variable factors such as, e.g., available supply and the time remaining before the 'sell by' product expiration date.

These and other features of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

FIG. 3 is a screen shot of a sample shopper registration form in accordance with one embodiment of the invention.

FIG. 4 is a screen shot of a sample 'product categories' page in accordance with one embodiment of the invention.

FIG. 8 is a screen shot of a sample 'shopping list' generated by the system in accordance with one embodiment of the invention.

FIG. 9 is a screen shot of a sample 'virtual shopping cart' generated by the system in accordance with one embodiment of the invention.

FIG. 10 is a screen shot of a sample 'delivery information' page generated in accordance with one embodiment of the invention.

DETAILED DESCRIPTION OF PREFERRED EMBODIMENTS

Figure 1:
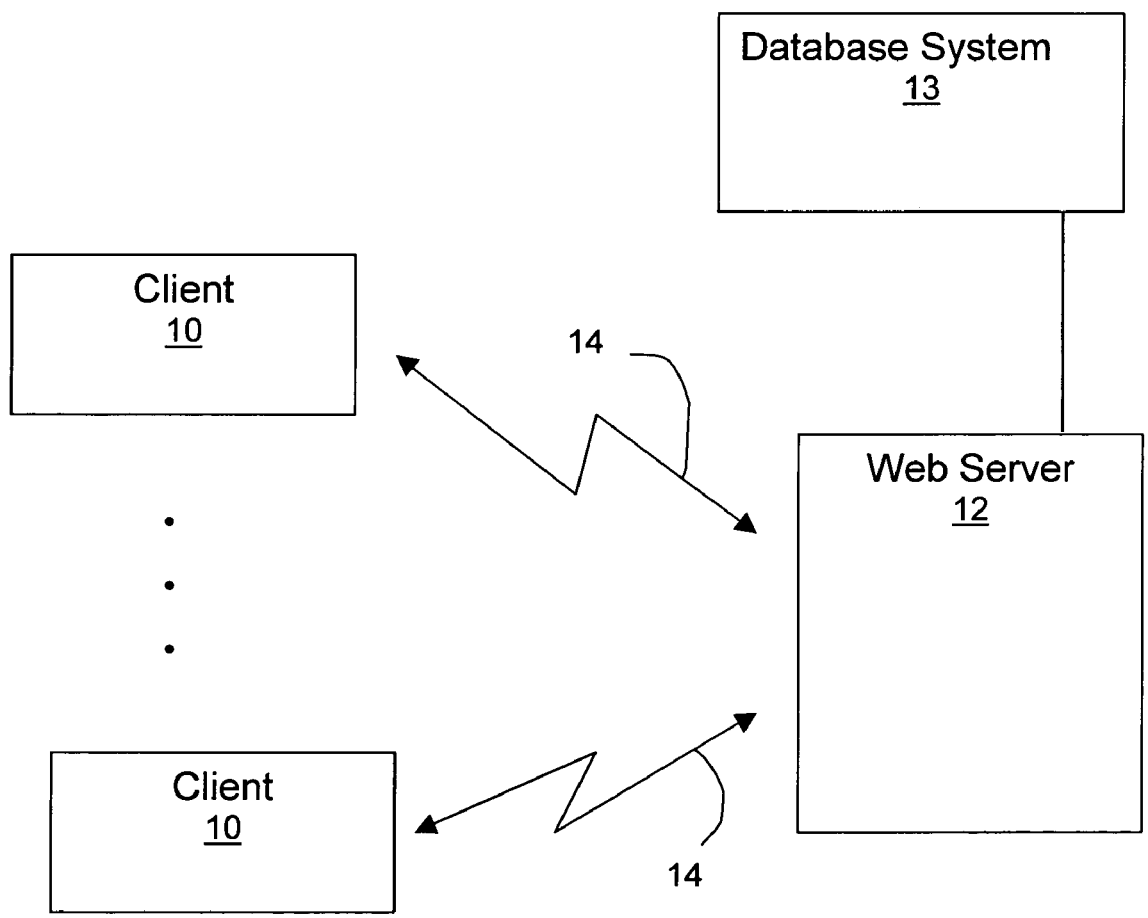
FIG. 1 is a simplified block diagram of a representative network in which the merchandize-ordering portion of the inventive system is preferably implemented.

FIG. 1 illustrates a representative network through which shoppers can place orders in accordance with the invention. The network includes a plurality of client machines 10 connected to a Web server 12 via communication channels 14. The channels 14 preferably comprise Internet connections. The client machines 10 can alternatively communicate with the server 12 through an Intranet or some other known network. In the case of the Internet, the Web server 12 is one of many servers that are accessible by clients.

By way of example, the client machine 10 can comprise a personal computer such as a Pentium-based desktop or notebook computer running a Windows operating system. As is well known, a representative computer includes a computer processing unit, memory, a keyboard, a mouse and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired.

The client machine 10 includes a browser, which is a known software tool used to access the servers of the network. Representative browsers include, among others, Netscape Navigator and Microsoft Internet Explorer. Client machines usually access servers through some private Internet access provider or an online service provider (such as, e.g., America Online).

Another possible type of client machine 10 is a portable device having a wireless link to the Internet. An advantage of a wireless device is that it can be used virtually anywhere including, e.g., in a vehicle as will be described below. One example of a wireless Internet device is a Palm Pilot brand hand held computer sold by 3Com Corporation. The Palm VII version of the Palm Pilot offers a wireless connection to the Internet using a technology knows as 'Web clipping,' in which Web pages are reformatted to fit the Palm Pilot's small screen. While Web clipping is an open system model based on Internet standards, Internet content providers may need to adapt content to make it easily available to Palm VII users as is well known. Another example of a wireless Internet device is a Web-enabled wireless telephone.

Another type of client machine 10 can be a Web-linked screen phone. By way of example, such a phone can be of the type developed by Alcatel of France and marketed by US West Corporation. These phones include a color screen and pop-out keyboard. They can reach an Internet service provider by telephone lines, and allow users to navigate the Web by touching Web links on the screen, rather than using a mouse. Other types of Web-linked screen phones can also be used.

By way of example, the Web Server 12 comprises an IBM RS/6000 computer running the AIX (Advanced Interactive Executive Version 4.1 and above) Operating System and a Web server program (such as Netscape Enterprise Version 2.0) that supports interface extensions. (Various other suitable hardware/operating system/web server program combinations are possible.) The server 12 also typically includes a graphical user interface (GUI) for management and administration. A typical server also includes RAM, ROM, hard drive, modem, and an optional removable storage device, e.g., floppy or CD-ROM drive. The server 12 is connected to a database system 13, making various databases accessible by the server 12. The databases contain various data as will be described below, including information on customers, inventory, available personnel, etc.

The Web server 12 operates a so-called 'Web site' and supports files in the form of documents and pages. A Uniform Resource Locator (URL) identifies network path to a Web site that is generated by the server. The World Wide Web is the Internet's multimedia information retrieval system. In particular, it is a collection of servers of the Internet that uses the Hypertext Transfer Protocol (HTTP). The World Wide Web provides users access to files (which can be in different formats such as, e.g., text, graphics, images, sound and video) using, a standard page description language, e.g., Hypertext Markup Language (HTML). HTML provides basic document formatting and allows developers to specify links to other servers and files. These links include "hyperlinks," which are text phrases or graphic objects that conceal the address of a site on the Web.

A user of a client machine having a browser (e.g., Netscape Navigator) can retrieve a Web page of a Web site by specifying a link via the URL. Upon such specification, the client machine makes a transmission control protocol/Internet protocol (TCP/IP) request to the server identified in the link and receives the Web page in return.

The present invention is directed to a method and system for selling merchandise and is preferably implemented in the Internet environment. The system includes a Web server (such as server 12) that hosts a Web site accessible via the Internet by shoppers using various individual client machines 10.

Figure 2:
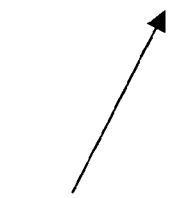
FIG. 2 is a screen shot of a sample home page of a grocery shopping Web site in accordance with one embodiment of the invention.

The Web site preferably includes a home page, a simple sample 100 of which is shown in FIG. 2. The system preferably requires shoppers to pre-register prior to use. Registered members can access the system by entering a valid username/password combination. New users are preferably asked to preregister with the system.

FIG. 3 illustrates a sample registration form Web page 120 for new users. The form includes various fields in which users can enter values using some input device on their client machines (such as, e.g., a keyboard). For example, the user is preferably asked to select a user identification and password for future secured access to the system. The user is also preferably asked to certain other information, including, e.g., contact information (such as, e.g., address information) and demographic information, which the system can use to selectively market items to users having particular characteristics as will be described below. The system also preferably asks the user to provide payment information. Preferably, the system automatically electronically charges consumers for purchases using credit or debit card information. Alternatively, the system can send invoices to the user's billing address (typically a mailing address or an email address).

Once a user has registered with the system (or at some future time logged on with his or her correct username and password), he can select items for purchase. Initially, the user will preferably be shown a 'product categories' Web page, a simple sample 140 of which is shown in FIG. 4. As shown, there are preferably a number of major categories, under which there are a number of subcategories. (For convenience of illustration, only a few of the possible categories and subcategories are shown.) The shopper can also preferably find a desired product by performing a keyword search through the system database containing product information.

The subcategories are preferably hyperlinked to Web pages having further information on products in those subcategories. For example, if the subcategory 'milk' is selected, a sample Web page 160 of the type shown in FIG. 5 can be generated and displayed. The FIG. 5 Web page allows buyers to select a particular milk product available identified by type (e.g., skim or whole), brand, size and quantity. The system preferably stores in a database information on items previously purchased by the logged-in consumer. From this historical information, the system can determine the customer's preferences for particular products. For convenience, the system then preferably highlights in FIG. 5 customer preferences, making it appear that a particular type, brand and size has been selected. (For example, in FIG. 5, a customer preference for Brand X skim milk in a one-gallon size is indicated.) The user then simply presses the 'select' button 161 to confirm this choice. He can, of course, select an alternate item if desired.

Once the user has selected the milk product desired and pressed the select button, the system preferably dynamically determines whether any incentive should be provided to encourage a customer to alter his or her choice of a product. (The term 'incentive' as used herein is intended to include both rewards (e.g., lower prices) in some cases to encourage certain choices and deterrents (e.g., higher prices) in some cases to discourage certain choices.) It may be desirable to have the customer change his or her choice of a particular product for various reasons. For example, the customer may have chosen an item that is in short supply. (The system may also "know," e.g., that a future shipment of the product from a manufacturer has been delayed for some reason, and it may be desirable to 'stretch' current supplies until the shipment arrives.) Another reason for encouraging the customer to alter his or her choice may be that a similar product (e.g., another brand of the same type of product) may be overstocked or have a product 'purchase by' or 'sell by' (i.e., expiration) date that is about to expire. Yet another reason for attempting to alter the customer's choice may be to promote a competing product. (A manufacturer of a competing product may wish to promote its product in this manner. The manufacturer will preferably be charged some fee for the promotion.)

Figure 6:
FIG. 6 is a screen shot of a sample 'selected product' page in accordance with one embodiment of the invention.

Once a determination is made on whether and what type of incentive is to be provided to the consumer, a sample Web page 180 of the type shown in FIG. 6 may be generated. This page identifies the product selected by the buyer and the price. Preferably the price is dynamically calculated to include the incentive. For example, the price is higher than what it normally would be because of a shortage of the product. The amount of the increase would preferably be related to the degree of the shortage (e.g., an extreme shortage will result in a very high price).

(Optionally, the system does not reduce the price from what it normally would be if there were an oversupply of the product selected since in most cases the buyer will purchase the item at the 'normal' price because he or she has selected it in the first place.)

In addition (or as an alternative) to adjusting the price of the item selected by the consumer, the system can show an alternative choice of a similar item (e.g., Brand Y skim milk), which is more favorably priced. The price of the alternative choice can be adjusted to enhance the incentive to the customer if desired, i.e., the price of the alternative choice can be reduced to increase its appeal. The system might wish to encourage the customer to choose Brand Y milk because it may, e.g., be in oversupply.

Alternatively (or in addition), the buyer may be offered the alternative product at the same (or different) price as the selected item, but with "bonus shopping points." These would be similar in concept to bonus frequent flyer "miles" provided by airlines (e.g., AAdvantage brand miles provided by American Airlines), which are redeemable for future purchases of products and services.

Alternatively, some combination of adjusted prices and other incentives such as bonus points may be provided to encourage particular choices.

The shopper then decides what product (e.g., the selected one or the alternative offered by the system) to purchase and presses the associated 'yes' button to add the item to his or her 'virtual shopping cart,' which is simply a list of items 220 selected for purchase (shown in FIG. 9).

Although not shown, the system can also have different prices for the same brand product of the same size depending on its freshness as indicated by its 'purchase by' expiration date. The price can be calculated by, e.g., calculating the number of days remaining before expiration. A fresher product (i.e., the one with the greater number of days remaining before expiration) will be priced somewhat higher than less fresh products under this pricing scheme. The amount of the price difference is preferably related to the degree of the freshness (e.g., there will be a relatively large price difference if there is a large difference in the expiration dates).

Alternatively or in addition, other incentives (such as bonus points) can be provided to encourage sales of the less fresh products.

The system thereby allows the shopper an opportunity to weigh how much a particular product is worth to him or her in making a purchase. For instance, a customer who highly values Brand X milk will be willing to pay a higher price, while one who does not will instead select Brand Y milk. Also, e.g., a customer who uses a given product (such as, e.g., milk) quickly may well be willing to purchase a product that is closer to its expiration date (given proper incentive, of course) than other available products. The system thereby avoids product shortages by making particular products available to those who most value them.

The system can also dynamically calculate prices to provide discounts to customers purchasing large quantities of given products.

Figure 5:
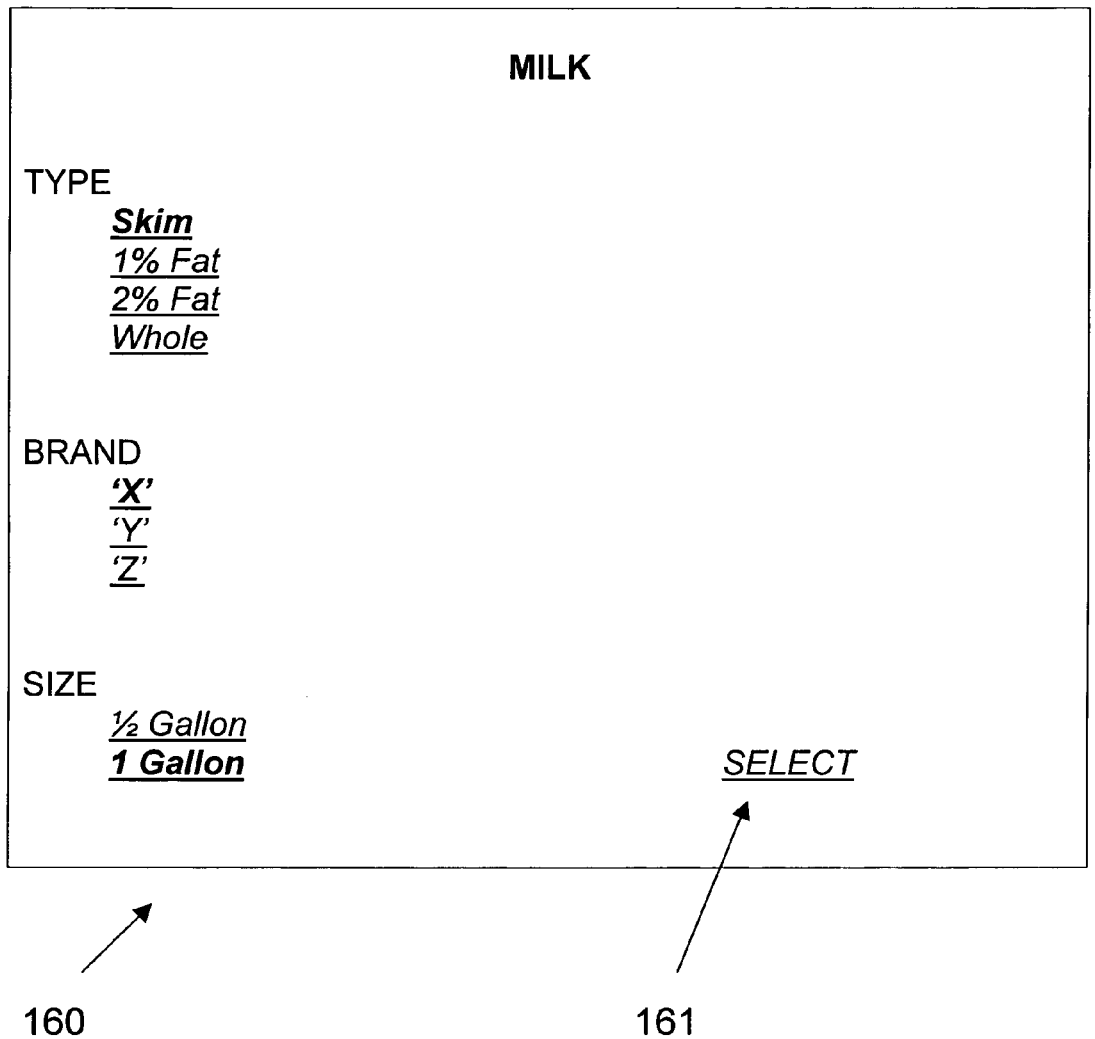
FIG. 5 is a screen shot of a sample 'product' page in accordance with one embodiment of the invention.
Figure 7:
FIG. 7 is a screen shot of a sample 'alternative product' page in accordance with one embodiment of the invention.

Instead of the Web pages 160, 180 of FIGS. 5 and 6 generated by the system after the user has selected 'milk' in FIG. 4, the system can generate a sample Web page of the type shown in FIG. 7. This page 200 preferably shows the prices of all 'milk' items available. Again, the system preferably dynamically determines whether to provide the buyer with any incentive to purchase any particular item and, if so, what type of incentive. The incentive may be provided in the form of adjusted prices (preferably dynamically calculated) or other incentives such as bonus points (not shown) or some combination of both. The user can then comparison shop and check the item desired and add it to the virtual cart.

For convenience, the system optionally generates a preliminary shopping list (e.g., sample page 210 shown in FIG. 8) for a given customer based on, e.g., (1) information collected in the database of previous purchases by that customer and (2) the time passed since the shopper's last purchase of a given item. For instance, if the system 'knows' (from the historical data) that the customer purchases a gallon of skim milk about once a week, and a week has passed since his or her last purchase of skim milk, then the system will automatically add a gallon of skim milk to the preliminary shopping list. The user can, of course, override the system selection and choose another item (e.g., a gallon of whole milk) or none. He or she then presses the 'yes' button to add the item to the virtual shopping cart. For convenience, the preliminary shopping list 210 is preferably shown to the customer soon after he has logged onto the system.

The user can preferably at any point check what items are in his or her virtual shopping cart 220 (FIG. 9). He can remove items from the cart or continue to add other items, e.g., by browsing through categories of products or doing a key word search for all items in the store.

The system preferably displays pictures of products along with nutrition labeling and other information as requested by the shopper.

The system preferably allows shoppers to perform online searches for products meeting particular nutrition or dietary requirements, e.g., to identify all types of ice cream available having a given maximum saturated fat content. The system preferably stores in a database detailed nutritional information on available products. A customer can ask the system to identify all products of a certain type (e.g., ice cream) that have certain nutrition characteristics (e.g., a daily maximum recommended saturated fat amount per serving of less than 60%). The system searches the database for products meeting the criteria and displays them to the shopper. This allows shoppers to quickly and conveniently find products meeting their needs without having to examine each of the various different products on a shelf at a traditional supermarket.

When the user has completed shopping, he or she can arrange for either pickup or delivery of the products by making an appropriate selection in FIG. 9. If delivery is selected, the system preferably generates a sample Web page 240 of the type shown in FIG. 10. For convenience, the system preferably pre-inserts a default delivery address of the customer from the system database containing customer information. The customer can, of course, change this default entry if delivery to some other address is desired.

The page 240 also preferably specifies available delivery times and corresponding delivery prices (if there is a charge for delivery). The prices are preferably dynamically calculated based on the availability of system resources to prepare and deliver the order. The system preferably provides incentives to users to select times when system resources are underutilized. For example, the system charges a higher delivery fee at the 2:30–3:00 PM time slot (and thereby discourages selection of it) than at the 9:30–10:00 PM slot because many more people may have requested afternoon delivery than evening delivery and sufficient staff may not be available in the afternoon to make timely deliveries. By encouraging customers to select delivery times when system resources are underutilized, the system is able to more efficiently use resources and thereby reduce costs. As an alternative to adjusting delivery prices, the system can provide other incentives such as bonus shopping points to encourage choice of delivery at certain times. Alternatively, some combination of adjusted prices and other incentives such as bonus points can be provided.

The system can also dynamically calculate delivery prices based on the customer location. For instance, a customer further away from where the products are stored may be charged a higher price than a nearer customer. Distances between the delivery origination location and particular customers can be easily determined using one of a variety of online services available providing map information such as, e.g., mapquest.com.

Also, for efficiency, the system preferably encourages a customer to select particular times when a delivery truck is expected to be nearby to the customer making some other prescheduled delivery. For instance, if a delivery has been scheduled at some scheduled time for one or more customers in a given neighborhood, then other customers placing subsequent delivery orders in the same neighborhood are provided with incentives to accept deliveries at that scheduled time.

Figure 11:
FIG. 11 is a screen shot of a sample 'pickup information' page in accordance with one embodiment of the invention.

Alternatively, in FIG. 9 the buyer may select the 'pickup' button to arrange to pickup his or her purchases. In this case, the system preferably generates a sample 'Pickup Information' Web page 260 of the type shown in FIG. 11. As shown, the buyer can select a particular pickup time slot. Again, to encourage optimal use of the pickup system, the system determines whether to provide incentives to encourage a pickup time when system resources are underutilized. Like the delivery system, the system preferably adjusts the total price charged to the consumer for the products, provides bonus points or other incentives, or some combination of both. For example, as shown the system attempts to discourage pickup at the 2:00–2:15 PM and the 2:15–2:30 PM time slots (by charging a pickup fee) because many other customers may have already selected these slots and the system may not have sufficient resources to quickly process the pickups. Customers wanting to make immediate pickups can select "as soon as possible" and can optionally be charged a premium for this option.

The customer can also preferably select 'self-service' or 'full-service' pickup as will be described below.

After the pickup or delivery information is entered by the user, a checkout page (not shown) is preferably generated by the system to confirm the order. If the user accepts what is shown, he or she is charged for the products ordered and the order is processed. The system preferably electronically charges the customer based on information such as, e.g., credit card information previously provided. This obviates the need for the costly and time-consuming processing of cash payments.

Customers can optionally place their orders for groceries using devices having wireless links to the Internet. Use of such wireless devices allows customers to place grocery orders from virtually any location, including, e.g., vehicles. Thus, a customer can place an order from his or her vehicle before or while on the way to the pickup location. This saves time and increases convenience for customers.

The shopper preferably picks up his or her groceries using representative pickup systems described below.

Figure 12:
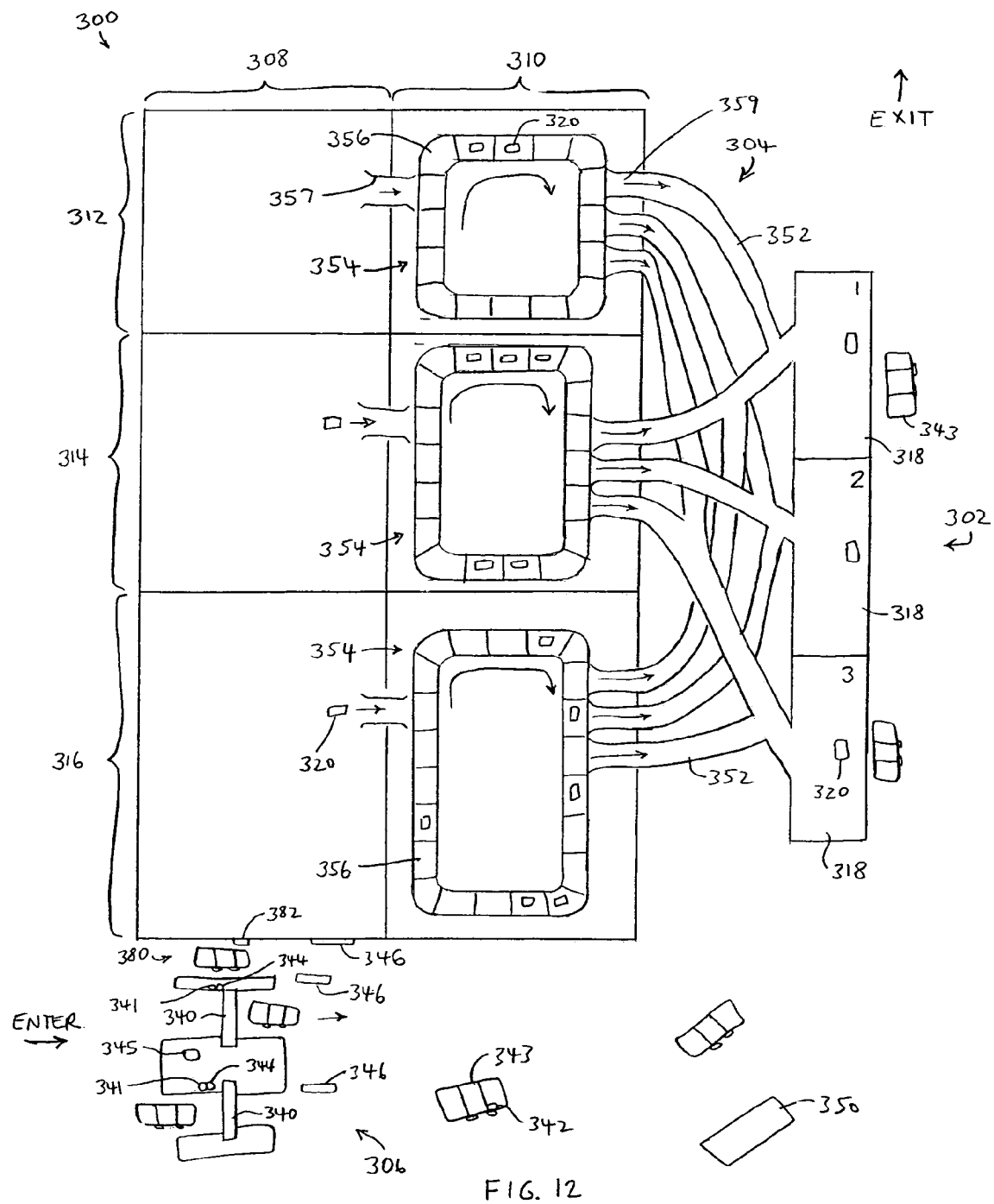
FIG. 12 is a simplified top plan view of an illustrative merchandize pickup system in accordance with one embodiment of the invention.

FIG. 12 is a simplified illustration of an ordered item pickup system in accordance with one embodiment of the invention. The system generally comprises a storage area 300, a vehicle loading area 302, and a transfer mechanism 304 for transferring products stored in the storage area 300 to the loading area 302. It also includes a customer detection area 306 for sensing the arrival of a customer to pickup his or her goods.

The storage area 300 is preferably comprised of a main storage area 308 and an intermediate storage area 310. The main storage area 308 is a relatively long-term storage area for keeping goods. The intermediate area 310 is where goods that have been ordered by customers are temporarily stored until the customer picks them up. While the main and intermediate storage areas are shown in the drawings as being in separate rooms, it should be noted that both storage areas could be part of the same room. Also, while only two storage stages are shown (i.e., main and intermediate areas), it should be realized that any number of stages may be used.

For grocery systems, the storage area 300 is preferably further divided into a refrigerated section 312 (for storing refrigerated products like milk), a freezer section 314 (for storing frozen products like ice cream) and a room temperature section 316 (for storing items at least initially kept at room temperature like canned goods). Grocery products can thereby be stored in optimal temperature conditions in both main and intermediate storage areas to avoid spoilage.

The vehicle loading area 302 preferably comprises multiple loading stations 318 at which customers can pick up ordered goods. While the FIG. 12 shows three stations 312, it should be noted that any number could be provided as desired. Multiple loading stations are preferred to enable quick transfer of goods to customers. However, in accordance with another embodiment of the invention, a single loading station is provided.

Figure 14:
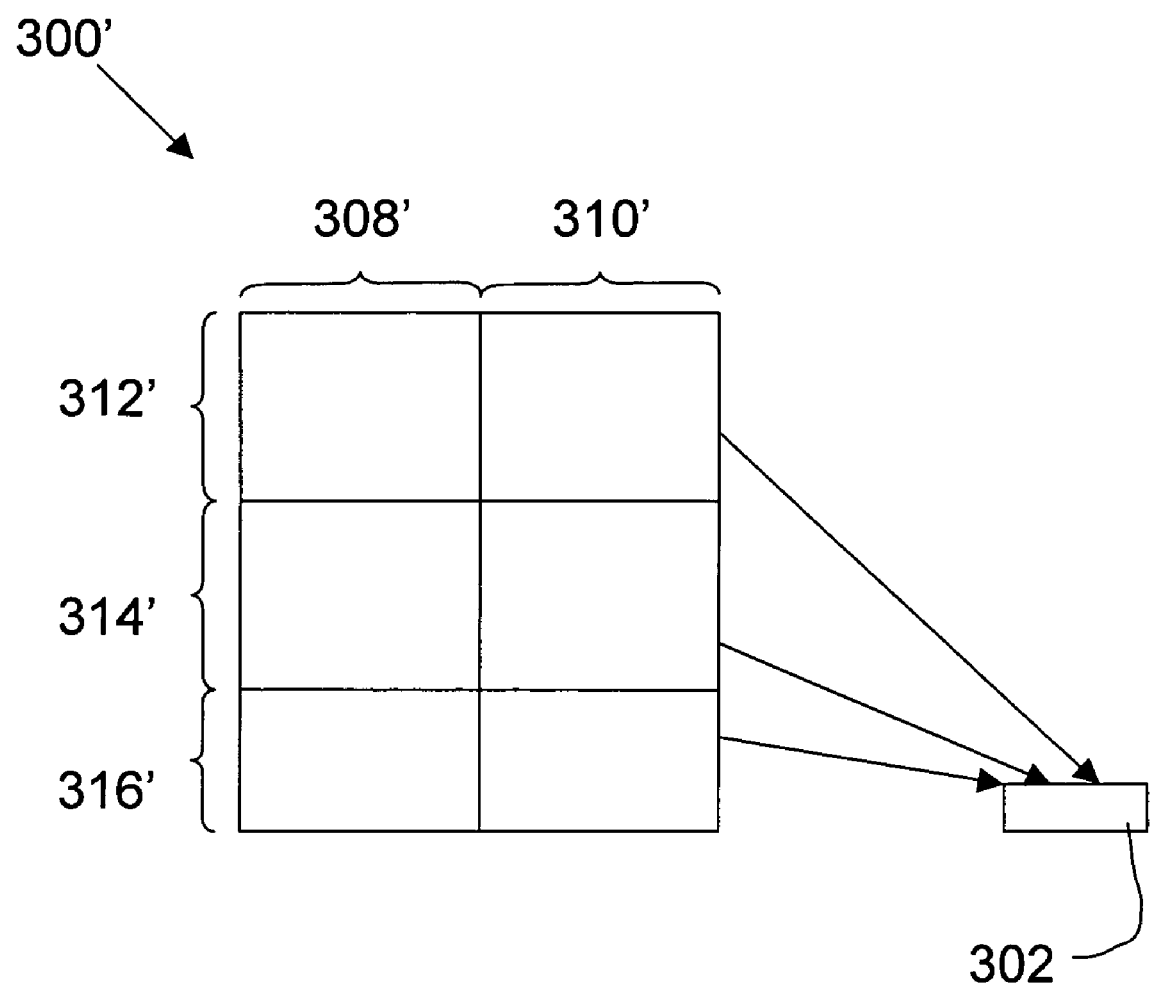
FIG. 14 is a simplified side view of a pickup system with an alternative merchandize storage structure.

While the FIG. 12 drawing shows the entire storage area as being on a single floor, FIG. 14 shows an alternate embodiment wherein the storage area 300' is on multiple floors. This is unlike traditional supermarkets, which are typically on a single floor. One reason for having supermarkets on a single floor is that large numbers of shopping carts cannot be quickly or easily be moved from one floor to another. In the present system, shoppers normally do not enter the storage area, thus making use of multiple floors practical. Use of a multi-storied building results in a more efficient (and less costly) use of land space. Thus, e.g., in FIG. 14, a refrigerated food section 312', a frozen food section 314', and a room temperature food section 316' can each be on a separate floor with each floor having a main and intermediate storage areas 308' and 310', respectively. Other configurations and arrangements of the various sections in a multi-storied building are also possible.

Figure 13:
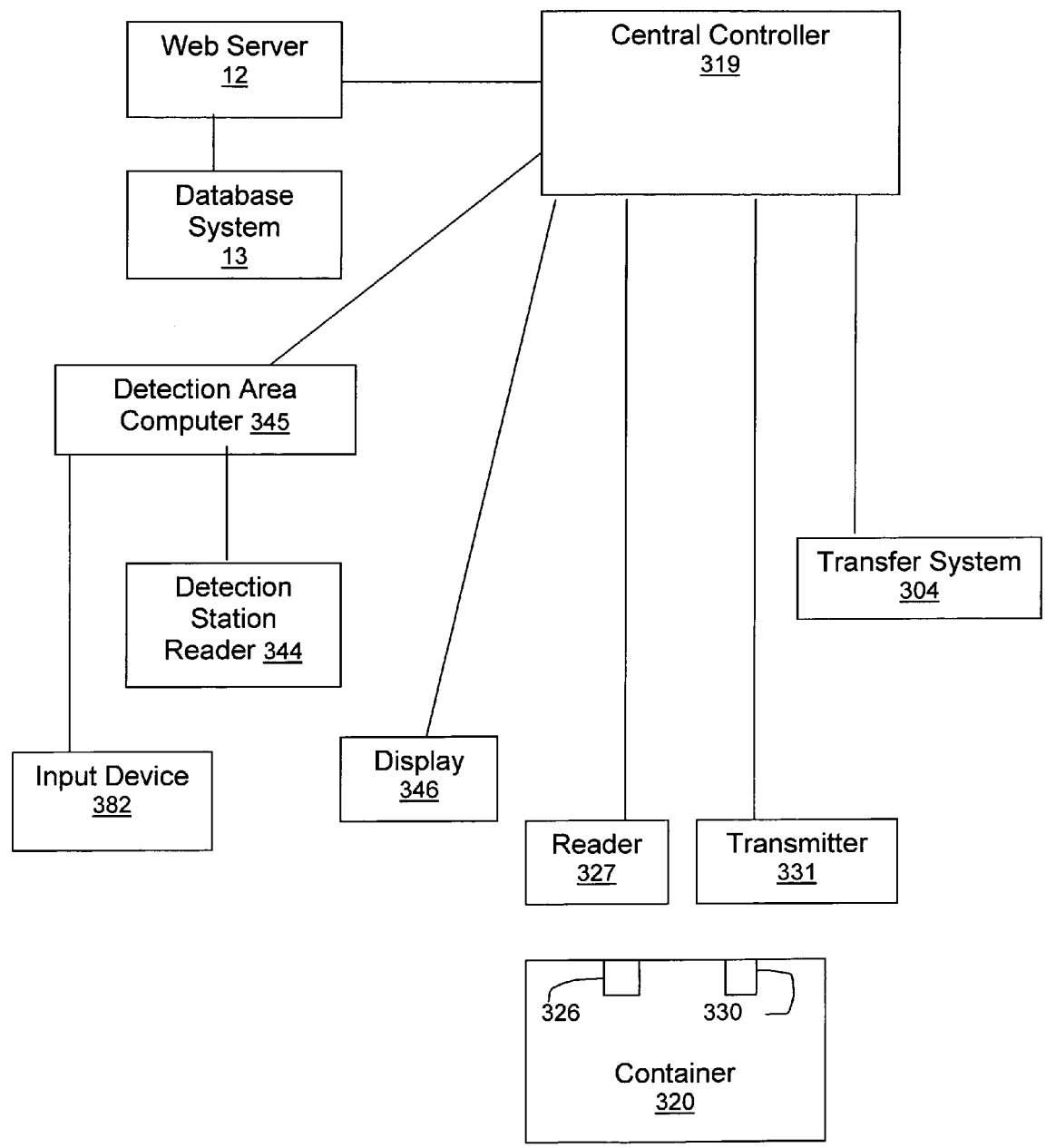
FIG. 13 is a block diagram illustrating operation of the central controller of the pickup system.

A pickup order placed by a customer is received at the Web server 12 as described above. In accordance with one embodiment of the invention, the Web server 12 communicates the order to a site central controller 319 (shown in FIG. 13), which processes the order and controls operation of various subsystems. The controller 319 comprises a computer with sufficient memory and processing capability to perform the functions described herein. Those skilled in the art will recognize that various system architectures can be used to perform the functions of the system. For example, while a single computer is described as acting as the central controller, those skilled in the art will realize that the functionality can be distributed over multiple computers.

After an order is received, the goods ordered are readied for pickup. This readying process generally involves identifying and collecting the selected products stored in the main storage area 308 and moving them to the intermediate area 310. The process of identifying and collecting the selected products is ordinarily performed by personnel known as 'product pickers' or is automated as is well known in the mail order industry.

Figure 15:
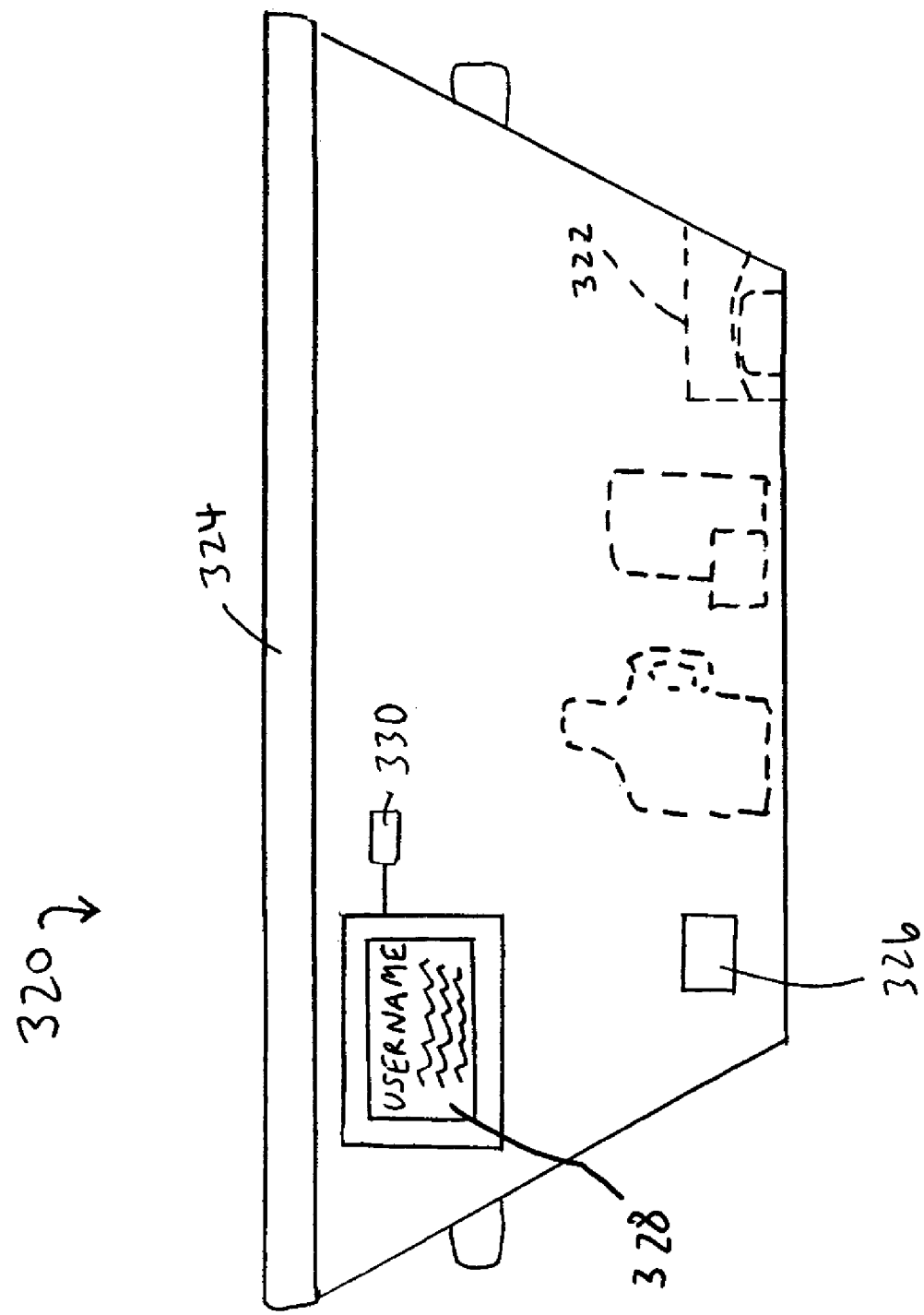
FIG. 15 is a front view of a container for holding ordered products in accordance with one embodiment of the invention.

In accordance with one embodiment of the invention, the goods are preferably collected and placed in a reusable standard container or bin such as, e.g., the container 320 shown in FIG. 15. The container 320, which preferably comprises a molded plastic body, includes an interior area for holding ordered goods and optionally includes an interior compartment 322 for holding breakable items such as, e.g., fresh eggs. The compartment 322 may include padded interior walls and/or some type of fastening mechanism (such as, e.g., a fastenable elastic strap) to keep breakable products from moving about in the container. Each container 320 preferably includes a lid 324. The container is preferably insulated to keep refrigerated and frozen products cool when the container is at a loading station.

Each container 320 also preferably includes a unique identification marking 326 that can be read by a machine reader 327 and transmitted to the controller 319, which uses the information in order processing. The controller associates the marking 326 on a container 320 with a particular customer order. The identification marking 326 comprises, e.g., a radio frequency identification (RFID) tag as will be described below. It may alternatively comprise various other well known machine-readable markings or indicia such as, e.g., a bar code marking readable by a bar code scanner.

The container 320 also optionally includes a microprocessor-controlled, battery-powered electronic display 328 such as an LCD or LED display, which preferably displays the customer username (or some customer identification marking), an order identification, and the merchandize to be placed in the container. An input device 330 (such as, e.g., an infrared optical communications receiver) is provided to receive the information to be displayed from the controller 319 via a transmitter 331 (such as, e.g., an infrared transmitter). Preferably the information to be displayed is input at the same time the marking 326 is read to associate an order with the container 320. Having the customer name displayed helps ensure that the correct container is provided to the customer at time of pickup. Having merchandize information displayed can assist personnel in loading the correct products in the container 320.

Alternatively, the information can be printed on paper (or some other fixed medium) and affixed to the container (e.g., inserted into a transparent paper holder secured on the container).

After a customer order has been received, an available container 320 is associated with the order and loaded with the ordered goods. (Loading can be performed immediately upon receipt of the order or at some later time if the selected pickup time is not immediate.) For convenience, the goods are preferably first loaded in disposable plastic or paper bags that the customer can take home. Once the container 320 has been loaded, it is moved from the main storage area 308 to the intermediate area 310 to await customer pickup. Then upon arrival of the customer to pickup his or her goods, the container 320 is moved (preferably automatically) from the intermediate area 310 using the transfer mechanism 304 to the loading area 302 for pickup. (The goods are preferably not moved to the loading area 302 until arrival of the customer at the site in order to reduce spoilage of the products since the loading area 302 will typically be outdoors and not in a temperature controlled environment.)

Multiple containers may be associated with a given order depending on what is ordered. For example, the customer may have one or more containers with frozen products, one or more containers with refrigerated products, and one or more containers with room temperature stored products.

The customer detection area 306 is preferably located at an entrance to the site some predetermined distance away from the loading area 302. The detection area 306 is used to detect and identify approaching customers. Upon detection and identification of a customer, the system identifies and locates the container(s) associated with an order placed by the customer and initiates transfer of the container(s) from the intermediate area to the loading area.

The detection area 306 preferably comprises one or more customer detection and identification stations 340, preferably of the type used, e.g., in automated highway toll collection stations. Customers are provided with identification tags 342, e.g., RFID tags or transponders, to place in (or on) their vehicles 344. Transponders are usually mounted behind vehicle windshields. As is well known, a transponder typically contains a radio receiver, a radio transmitter, a dedicated logic circuit, and a battery. Each transponder contains information uniquely identifying a particular customer to the system, e.g., a unique identification number. Each station 340 preferably includes an automatic vehicle identification (AVI) antenna 341 that sends out radio signals. A transponder 342 in a vehicle 343 approaching the station responds to the AVI signal by transmitting a signal that contains the transponder's identification number. The station also contains an AVI reader 344, which receives the identification information from the transponder 342. The reader 344 that is linked to one or more detection area computers 345 that collect raw data and sort oncoming data from the various stations. The computer 345 communicates the received information to the central controller 319.

For customer vehicles not equipped with an identification tag 342, a separate lane 380 is preferably provided having an input device 382 (such as a keypad) into which the customer can enter his or her identity. The customer can, e.g., enter his or her username and password. This information is also transmitted to the central control system.

Alternatively, the customer can be provided with an identity card, and the input device 382 can comprise a card reader for reading the identity card. Such a card could have, e.g., a magnetic strip encoded with information on the identity of the customer. A customer credit card can also be used for this purpose.

Alternative customer identification and detection systems can be used including, e.g., one using global positioning system (GPS) tracking.

This information can optionally be used to monitor vehicles entering and leaving the site for security purposes (e.g., to reduce theft by employees).

Once the central controller 319 has identified the customer by matching the information received from the detection area to customer data stored in the system customer database, the order placed by the customer is identified. The controller then matches the customer order to the container or containers in which the ordered merchandise has been previously placed (e.g., manually by product pickers or using an automated mechanism). The system then preferably dynamically assigns the customer a particular loading station 318 to which he or she can drive to pickup the ordered groceries (if there are multiple loading stations). The loading station 318 is selected preferably by determining which of the plurality of loading stations is not being used or is most underutilized (i.e., which one has the fewest number of vehicles currently assigned to it for pickup). Also at that time, the system initiates transfer of the container(s) associated with the customer's order to the selected loading station 318 such that preferably by the time the customer arrives at the assigned loading station (or shortly thereafter) the ordered groceries are available to be loaded in the vehicle.

The system notifies the customer of the loading station 318 selected preferably by displaying the loading station number on a display 346 provided in each lane. The display can comprise, e.g., an LCD or an LED display. (Alternatively, a single large display (not shown) can be provided for all lanes.) The display 346 can, e.g., provide the following sample message: "Mr. Doe, please proceed to Loading Station No. 2 to pickup your groceries." Preferably only the customer's username, which may be different from the customer's actual name, is displayed to maintain anonymity. Displaying username information allows the customer to verify that the system has correctly identified him. If, as a result of some error, the system incorrectly identifies the customer (or is unable to identify the customer), a manned help station 350 can be provided to assist the customer (e.g., to perform the function of the automated customer detection and identification station).

For security, the loading stations preferably include gates that automatically open once the customer is identified.

The transfer system 304 is used for moving the container (s) associated with the customer from the storage area 300 to a particular selected loading station 318. A variety of transfer systems can be used for this purpose. For example, as shown in FIG. 12, the transfer system 304 includes multiple transporters 352 (e.g., conduits, chutes, conveyors and elevators) extending from each section of the storage area 300 to each one of said loading stations 318. The transfer system 304 preferably also includes container locating mechanisms 354 (preferably automated), which identify and load containers onto selected transporters leading to particular loading stations 318. The central controller 319 preferably controls the locating mechanisms 314.

The locating mechanisms 354 are preferably located in each section of the intermediate storage area 310. As shown in FIG. 12, each locating mechanism 354 may comprise an endless rotating conveyor. The conveyor can include multiple slots 356, each configured to receive a container. The locating mechanism 354 preferably tracks the position of each slot 356 as the conveyor moves to load or unload containers thereon. The conveyor preferably moves in a step fashion past a loading ramp 357 (from the main storage area) and past unloading ramps 359 (leading to various loading stations). When a container has been filled with ordered products in the main storage area, it is identified (i.e., its identification marker is read) and loaded onto the conveyor into one of the slots 356. By tracking movement of the slots, the control system 'knows' the location of the container as the conveyor rotates. When the central controller determines that it is time for the container to be delivered to a given loading station, the conveyor is moved to position the container at the entry (i.e., an unloading ramp 359) of a transporter 352 leading to that loading station 318. A mechanism (preferably automated) is provided at the unloading ramp 359 of each transporter 352 to move the container onto the transporter. The system thus automatically moves containers as needed from storage to the loading station when needed.

Alternatively, containers 320 could be manually moved from the storage area to selected transporters 362 leading to the loading stations 318. The containers could also be manually moved from the storage area directly to the loading stations. Alternatively, some combination of manual and automated transfer could be performed.

Figure 16:
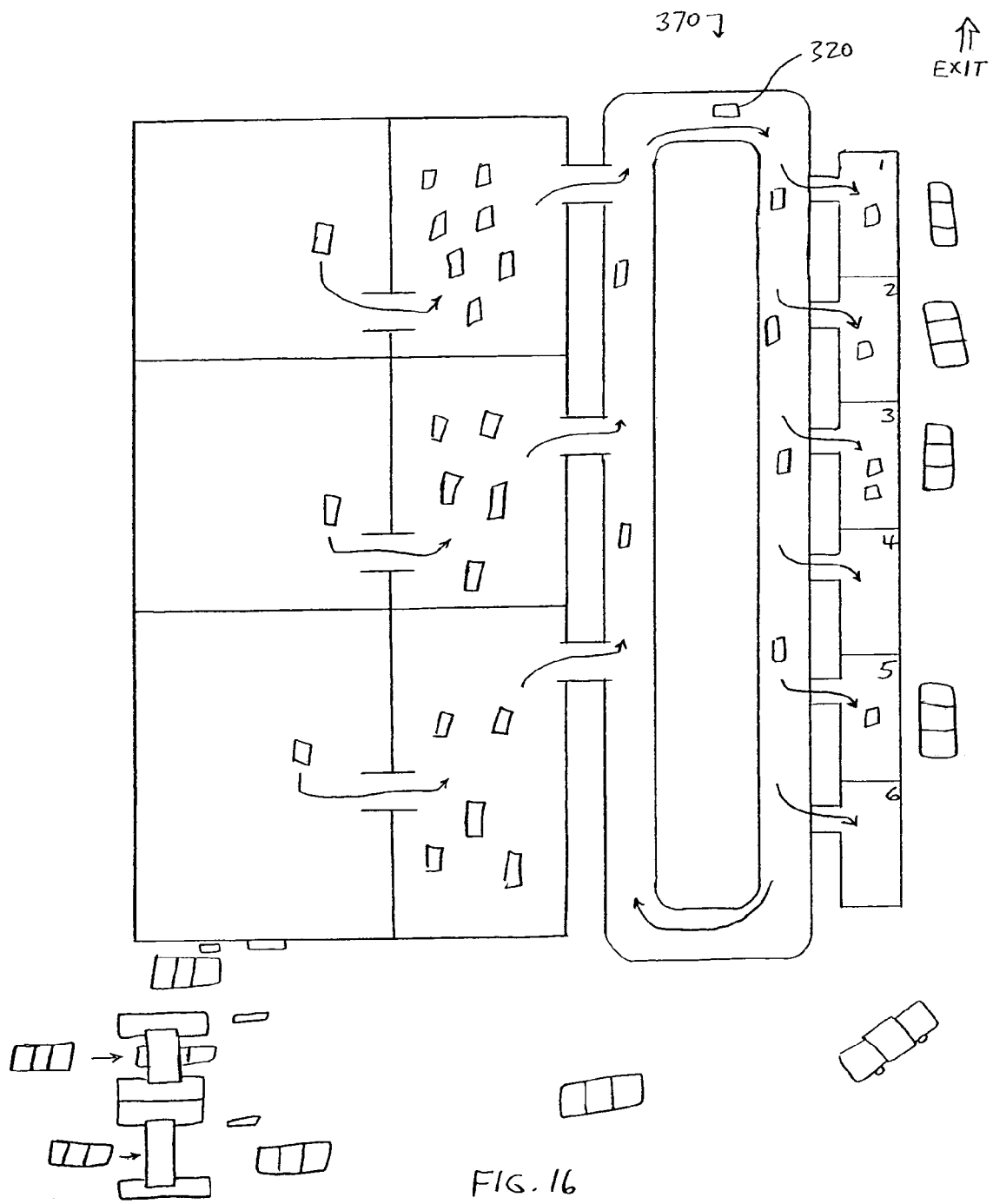
FIG. 16 is a top plan view of a pickup system in accordance with an alternative embodiment of the invention.

FIG. 16 illustrates an alternative transfer mechanism 370 comprising an endless conveyor located outside of the storage area. Ramps are provided at the storage area to move loaded containers onto the conveyor. Loaded containers can be manually or automatically moved from the intermediate storage areas onto the conveyor (when the presence of the customer is detected at the detection station). Each loading station includes an off-ramp preferably equipped with a detector/unloader mechanism that automatically identifies (preferably from marker 326 on the container) and retrieves containers 320 from the conveyor intended for the particular loading station. This detector/unloader mechanism communicates with the control system and receives information on which containers it is supposed to retrieve. Alternatively, the container could be manually transferred from the conveyor to the assigned loading stations. For this purpose the display 328 on each container 320 (or the printed sheet affixed to the container) identifies the assigned loading station. (The assigned loading station number is preferably entered into the input device 330 of the container upon assignment of the loading station by the controller 319.)

Various other types of transfer mechanisms are possible in accordance with the inventive system for quickly and efficiently moving products from the storage area to a loading station.

As the shopper drives to the designated loading station 318, container(s) with the shopper's goods are being transferred from the storage area to the loading station. At the loading station, the shopper opens his or her car (e.g., the car trunk) and loads goods from the container 320 if the loading station is a self-serve station. If the station is a full-serve station, personnel will be available to load the groceries in the customer's vehicle. (This is particularly convenient since customers can remain seated in their vehicles.) As previously discussed, the customer preferably selects at the time of placing his or her order whether to use a self-serve or a full-serve pickup station.

Once the groceries have been loaded in the vehicle, the container 320 is preferably left at the loading station to be reused. A container return mechanism (not shown) can be provided to move unloaded containers from the loading station back to the main storage area for reuse. In order to reduce loss (by, e.g., theft) of containers, the system can optionally include a detection station at a site exit (similar to theft detection stations at retail stores) to detect any containers taken in shoppers' vehicles. An alarm can be sounded if any containers are detected at the exit to alert the customer to return the container.

Figure 17:
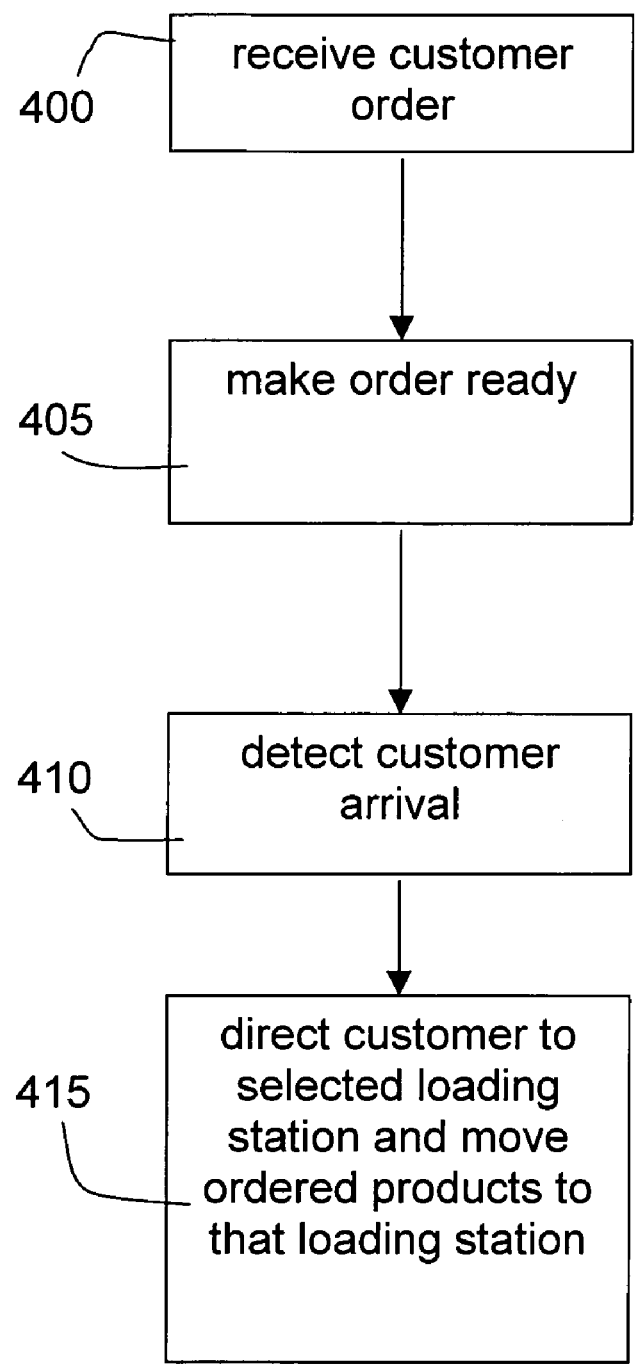
FIG. 17 is a flow chart illustrating merchandize pickup in accordance with one embodiment of the invention.

FIG. 17 is a flowchart summarizing the pickup process in accordance with the preferred embodiment. An order for merchandize is received from a customer at 400. After the order is received, the merchandize is readied for pickup at 405. As previously discussed, this generally involves retrieving the merchandize from storage and preferably loading it into one or more containers. The containers are preferably moved into an intermediate storage area. Arrival of the customer is detected at 410, and he or she is identified. The customer is then directed to a selected one of a plurality of loading stations at 415. Also, the container or containers associated with the customer are identified and located and moved to the selected loading station.

Figure 18:
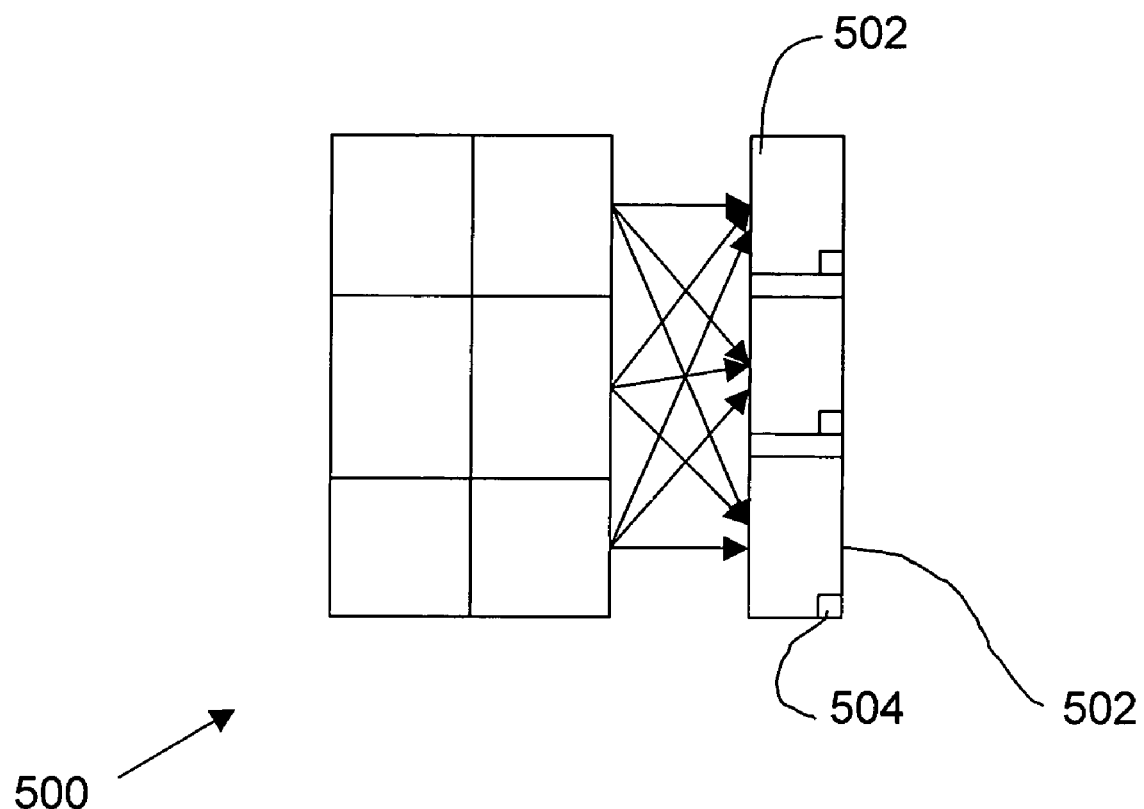
FIG. 18 is a simplified top plan view of a pickup system in accordance with an alternative embodiment of the invention.

Various other types of pickup systems are also possible. For example, FIG. 18 illustrates an alternative pickup system 500 in accordance with the invention. This pickup system includes a plurality of loading stations 502, each equipped with a detection apparatus 504 to detect the arrival of a customer. In this embodiment, the customer selects and drives to one of the loading stations. When he or she arrives at the loading station, his or her arrival is detected, the order is identified, and transfer of ordered products to that loading station is initiated. The detection apparatus can comprise any of the detection apparatus described above including, e.g., apparatus for reading data from a transponder in the customer vehicle.

The pickup systems in accordance with the invention can conveniently be used for picking up groceries (and other merchandize) and at the same time various other items such as, e.g., dry cleaning, developed photographs, and recorded movies (sales and rentals) and music.

The system saves the consumer time and effort. It also reduces transaction costs for the seller. (For example, there are lower overhead costs. Goods can be stored in a warehouse type environment. Fewer employees are needed since many functions are automated.) In addition, the dynamic incentive calculation scheme optimizes use of system resources and increases system efficiency. The system also enables targeted marketing schemes based on information saved in a database, e.g., demographic data and data collected from tracking shopper use of the system.

The pickup system can exist by itself or in combination with the delivery system. Also, in a delivery system, a delivery vehicle loading system can be devised that is similar to the customer pickup system. For example, the customer detection and identification station could be used to identify a particular delivery vehicle from a fleet of such vehicles and guide that vehicle to a delivery vehicle loading station where merchandise to be delivered by that vehicle to one or more customers can be loaded. As with the customer pickup system, the delivery vehicle loading system preferably selects loading stations based on their availability and, in particular, which one is most underutilized.

While the inventive shopping system has been described in the context of grocery shopping, it should be noted that it can be used for various other products including, e.g., books, recorded music, recorded movies (sales and rental) and music, and fast food.

Having described preferred embodiments of the invention, it will be apparent to one skilled in the art that changes and modifications can be made thereto without departing from the spirit and scope of the invention.

The invention claimed is:

1. A system for selling groceries to customers, comprising:
   a computer for receiving an order for grocery products from a customer;
   a storage area containing different groceries including the grocery products ordered by the customer;
   a plurality of loading stations at which groceries can be loaded into customer vehicles;
   detection apparatus for detecting the arrival including a generally unique identifier of the customer to pickup previously ordered products; and
   a transfer mechanism responsive to detection of the customer by the detection apparatus for moving the products from the storage area to a loading station at which the customer can pickup the product.

2. The system of claim 1 wherein the computer comprises a Web server.

3. The system of claim 1 wherein said storage area comprises a main storage area and a temporary intermediate storage area, said intermediate storage area being used for storing products retrieved from the main storage area and readied for customer pickup.

4. The system of claim 1 wherein said storage area comprises an area for storing refrigerated goods, an area for storing frozen goods, and an area for storing goods at room temperature.

5. The system of claim 1 wherein said storage area is part of a multi-storied building and said different groceries are stored on various floors of said building.

6. The system of claim 1 further comprising means for dynamically assigning loading stations to arriving customers.

7. The system of claim 1 wherein said detection apparatus comprises a reader for reading data from an identification device associated with each customer.

8. The system of claim 7 wherein said identification device comprises a transponder.

9. The system of claim 7 wherein said identification device comprises an identification card and said apparatus comprises a card reader.

10. The system of claim 1 further comprising a plurality of detection stations, each including a detection apparatus.

11. The system of claim 1 wherein each loading station includes a detection apparatus.

12. The system of claim 1 wherein the transfer system comprises a container locating mechanism for locating a container in which said product is stored and transporters leading from the storage area to the loading stations for transferring the container from the storage area to a loading station.

13. The system of claim 1 further comprising a plurality of containers for storing ordered products, wherein each container comprises:

a container body including an interior space for holding the merchandise;

a microprocessor-controlled electronic display mounted on the container body for displaying information relating to ordered merchandize;

an input device for inputting the information to be displayed on said display; and an identification tag having a unique identifier on said body.

* * * * *